E. J. GULICK.
ANTIRATTLER FOR STEERING KNUCKLES.
APPLICATION FILED JUNE 11, 1919.

1,414,737.

Patented May 2, 1922.

INVENTOR
Edward J. Gulick
By Louis C. Vanderlip
Attorney.

UNITED STATES PATENT OFFICE.

EDWARD J. GULICK, OF ELKHART, INDIANA.

ANTIRATTLER FOR STEERING KNUCKLES.

1,414,737.  Specification of Letters Patent.  Patented May 2, 1922.

Application filed June 11, 1919. Serial No. 303,355.

*To all whom it may concern:*

Be it known that I, EDWARD J. GULICK, a citizen of the United States, and a resident of the city of Elkhart, county of Elkhart, Indiana, have invented certain new and useful Improvements in Antirattlers for Steering Knuckles, of which the following is a specification.

My invention relates to steering knuckles for automobiles, and more especially to anti-rattle devices for the cross-rod steering knuckle connection of a steering knuckle.

The principal object of my invention is the production of an anti-rattling device for the cross-rod steering knuckle link or connection. Other and collateral objects of my invention are mentioned and described herein.

Figure 1:
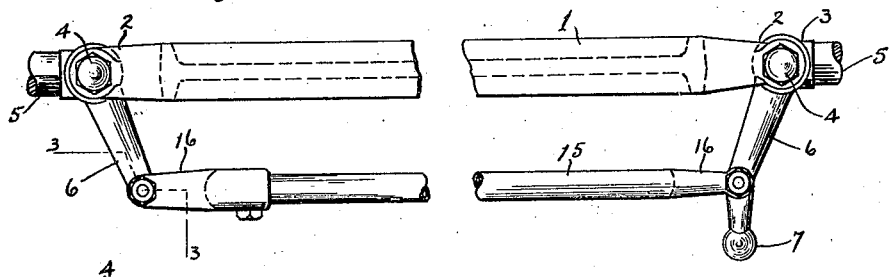
Figure 2:
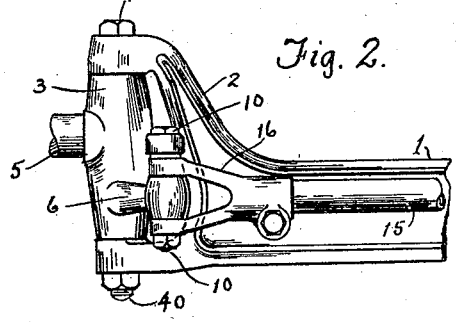
Figure 4:
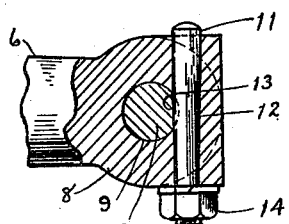
Figure 3:
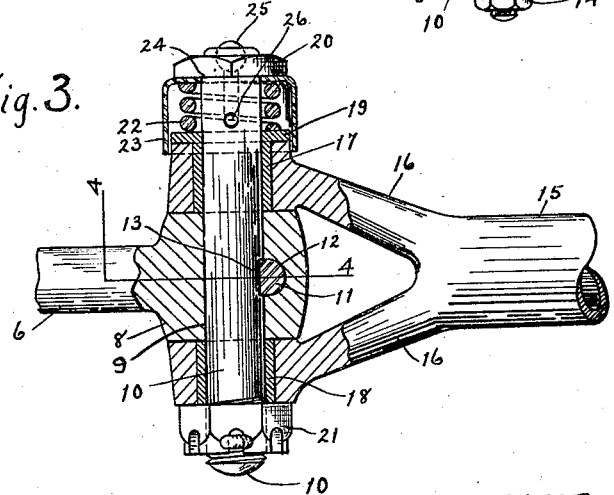

The preferred embodiment of my invention is illustrated in the accompanying drawing, in which Figure 1 is a plan view of an axle and steering knuckle mechanism of a motor car to which my invention is applied; Fig. 2 is a view in elevation showing one end of the front axle, a steering knuckle, and my invention applied thereto, the parts being enlarged; Fig. 3 is a section taken on the line 3—3 of Fig. 1, being enlarged; and Fig. 4 is a section taken on the line 4—4 of Fig. 3.

Similar numerals of reference indicate like members and parts of members throughout the several views on the drawing.

Referring to the drawing in detail, the numeral 1 indicates a front axle of an automobile of the usual design the opposite ends whereof are provided with the wheel spindle bearing forks 2, 2 in each of which forks a wheel spindle hub member 3 is pivotally mounted upon a vertically disposed pin or bolt 4, each of said hubs having a wheel spindle 5 projecting laterally therefrom and adapted to carry a wheel—not shown—as is well known in the motor car art. Each hub member 3 is provided with an actuating arm 6, one of said arms being provided with an extension 7 which is adapted for connection with the steering gear, not shown, of the motor car, which also is well known in the art.

Each steering arm 6 may have an enlarged end or head 8 which is bored at 9 to carry the cross-rod connection pin 10 which projects beyond said bore on each side of said head and which normally is disposed in a vertical plane, said pin being rigidly but detachably secured in said bore by a transversely arranged key or wedge member 11. The key 11 is detachably driven into a transverse groove or key-way 12 formed in the arm head 8 and projects into a key-way or groove 13 formed in the pin 10, one end of which key may have a nut 14 screw threaded thereon to retain it in position.

The numeral 15 indicates a cross-rod or link connecting the arms 6 by end forks 16, 16 disposed on opposite ends thereof, the tines of said forks being suitably bored and provided with the bushings 17 and 18 within which bushings the pin 10 bears. The fork bushing 17 has an annular flange 19 which may serve as a spring seat, as hereinafter mentioned.

Numeral 20 indicates a head which may be integral with the pin 10, and numeral 21 indicates a nut screw threaded upon the opposite end of said pin between which nut and the adjacent fork tine of the fork 16 there is a slight space to enable endwise movement of the pin 10 in its bearings. Numeral 22 indicates a coil spring mounted within a cup shaped spring casing 23, which casing is apertured centrally at 24 to permit the passage of the pin 10 therethrough and is seated against the under side of the pin head 20, said spring being compressed and seated against and upon the bushing flange 19, and bearing against the casing wall at its other end.

The exertion of the spring 22 effects a yieldable engagement between the arm head 8 and the fork tine in which the bushing 17 is mounted, whereby rattling of the cross-rod forks is either wholly eliminated or rendered negligible.

The numeral 25 indicates a lubricant receptacle mounted on the pin 10 the interior whereof is in communication with the oil or lubricant channel 26 formed in the pin 10 for supplying lubricant to the pin bearings.

I claim:

1. In a steering knuckle for a motor vehicle, an arm; a pin transversely mounted on said arm; adjustable means for preventing axial movement of said pin in its mount, said means being mounted upon said arm; a forked cross-rod element having its fork pivotally carried on said pin; and resilient means carried by said pin for pressing said cross-rod fork into engagement with said arm.

2. In a steering knuckle for a motor vehicle, an arm; a pin transversely mounted on said arm; means mounted in said arm for preventing axial movement of said pin in its mount; a forked cross-rod element having its fork pivotally carried on said pin; and resilient means for pressing said cross-rod fork into engagement with said arm.

3. In a steering knuckle for a motor vehicle, an arm; a pin transversely mounted on said arm; means for preventing axial movement of said pin in its mount, said means also preventing rotative movement of said pin; a forked cross-rod element having its fork pivotally carried on said pin; and resilient means carried by said pin for pressing said cross-rod fork into engagement with said arm.

4. In a steering knuckle for a motor vehicle, an arm; a pin transversely mounted in said arm; adjustable means carried by said arm for preventing axial movement of said pin in its mount, said means also preventing rotative movement of said pin; a forked cross-rod element having its fork pivotally carried on said pin; and resilient means for pressing said cross-rod fork into engagement with said arm.

5. In a steering knuckle for a motor vehicle, an arm; a pin transversely mounted in said arm; a wedge carried by said arm and engaging said pin to prevent axial movement of the latter in its mount; means for adjusting said wedge; a forked cross-rod element having its fork pivotally mounted on said pin; and resilient means for pressing said cross-rod fork into engagement with said arm.

In testimony whereof I have affixed my signature this 24th day of May, 1919.

EDWARD J. GULICK.